United States Patent

Jones, Jr. et al.

[11] Patent Number: 5,986,721
[45] Date of Patent: Nov. 16, 1999

[54] PRODUCING A RENDERED IMAGE VERSION OF AN ORIGINAL IMAGE USING AN IMAGE STRUCTURE MAP REPRESENTATION OF THE IMAGE

[75] Inventors: Girault W. Jones, Jr., Carrollton; Stephen W. Marshall, Richardson; Mark L. Burton, Dallas, all of Tex.

[73] Assignee: Texas Instruments Incorporated, Dallas, Tex.

[21] Appl. No.: 08/660,558

[22] Filed: Jun. 12, 1996

[51] Int. Cl.⁶ .............................. H04N 9/126; H04N 9/31
[52] U.S. Cl. .............................. 348/743; 348/771; 345/85
[58] Field of Search .................................. 348/771, 743; 345/507, 509, 85, 213

[56] References Cited

U.S. PATENT DOCUMENTS

| | | | |
|---|---|---|---|
| 5,459,528 | 10/1995 | Pettitt | 348/563 |
| 5,467,146 | 11/1995 | Huang et al. | 348/743 |
| 5,528,317 | 6/1996 | Gove et al. | 348/743 |
| 5,657,036 | 8/1997 | Markandey et al. | 345/85 |
| 5,737,036 | 4/1998 | Kanai et al. | 348/742 |
| 5,754,249 | 5/1998 | Zhaog | 348/521 |

FOREIGN PATENT DOCUMENTS

| | | |
|---|---|---|
| 0 507 270 A1 | 10/1992 | European Pat. Off. . |
| 2 132 387 | 7/1984 | United Kingdom . |

*Primary Examiner*—John K. Peng
*Assistant Examiner*—Jean W. Désir
*Attorney, Agent, or Firm*—Charles A. Brill; Frederick J. Telecky, Jr.; Richard L. Donaldson

[57] ABSTRACT

A method of controlling the display period of video data, and system thereof, that matches the frame period of displayed video data to the speed of a color wheel. The period of the color wheel is measured to determine the display period. An optimum frame sequence pattern is selected, based on the display period, to minimize the artifacts created in the displayed image while maximizing the portion of the frame period used to display the image data. The display period for each segment of the frame sequence pattern is scaled to fit the period of the color wheel, and each bit of the image data is loaded into the spatial light modulator and displayed at the proper time.

15 Claims, 2 Drawing Sheets

PRODUCING A RENDERED IMAGE VERSION OF AN ORIGINAL IMAGE USING AN IMAGE STRUCTURE MAP REPRESENTATION OF THE IMAGE

FIELD OF THE INVENTION

This invention relates to the field of display systems, more particularly to television and computer graphics video display systems that use a color filter wheel.

BACKGROUND OF THE INVENTION

Typical video and computer graphics display systems use a cathode ray tube (CRT) to convert electrical video signals into a luminous image. In its most basic form, the CRT is an analog device which includes an electron gun designed to emit a stream of electrons towards a phosphorous screen. The stream of electrons passes between two orthogonal pairs of charge plates before impinging on the screen. The two sets of plates are used to create an electric field which deflects the stream of electrons such that the stream of electrons impinges on the screen at a selected location. In a typical monochrome raster-scanned system, a brightness signal is applied to the gun of the CRT to control the intensity of the electron stream, and timing signals are applied to the two sets of plates to sweep the point where the stream of electrons impacts the screen across the screen row-by-row from top to bottom.

A typical CRT-based television system displays the image data as a serial stream of pixels, just as it is received. Vertical and horizontal synchronization signals, which are encoded along with the image data, are used to vary the charge on the CRT plates, thereby directing the electron stream to the proper point on the CRT screen. Because the synchronization signals encoded in the video signal control the aim of the CRT electron gun in real-time, the CRT-based display easily adapts to input video signals with differing frame rates. For example, CRTs used for computer displays must operate at a variety of frame rates such as 60, 66, 72, and 75 Hz, while PAL or SECAM televisions operate at 50 Hz. Additionally, a video source may drift about its specified frame rate. For example, if a videotape is stretched, the frame rate of the video signal will decrease. However, the video timing signals encoded in the video signal will alter the charge on the plates at the slower frame rate and the CRT-based display system will automatically adapt to the slower frame rate.

SUMMARY OF TIE INVENTION

In accordance with the present invention, a method and system for controlling the display period of a frame of video data is provided which efficiently controls the operation of a display system. According to one embodiment of the present invention, the frame period of a video signal is measured and an optimum frame sequence pattern is generated based on length of the video signal period. The frame sequence pattern determines which image bit is displayed during each portion of the image frame. One image bit is displayed during each segment of the sequence pattern. The display period for each segment of the frame sequence pattern is scaled so that the frame sequence pattern efficiently fits the video signal frame period, and the image data is displayed according to the scaled frame sequence pattern.

According to another embodiment of the present invention, the frame period of a color wheel is measured and an optimum frame sequence pattern is generated based on length of the color wheel period. The frame sequence pattern determines which image bit is displayed during each portion of the image frame. One image bit is displayed during each segment of the sequence pattern. The display period for each segment of the frame sequence pattern is scaled so that the frame sequence pattern efficiently fits the color wheel frame period, and the image data is displayed according to the scaled frame sequence pattern.

According to another embodiment of the present invention, a counter is used to measure the period of the video signal. The measured period of the video signal is used by a sequence pattern generator to determine the duration of each segment of the display period for each image bit. An output timing controller scales the duration of each segment of the sequence pattern to enable the display system to efficiently use the entire video signal frame period.

According to another embodiment of the present invention, a counter is used to measure the period of the color wheel. The measured period of the color wheel is used by a sequence pattern generator to determine the duration of each segment of the display period for each image bit. An output timing controller scales the duration of each segment of the sequence pattern to enable the display system to efficiently use the entire color wheel frame period.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
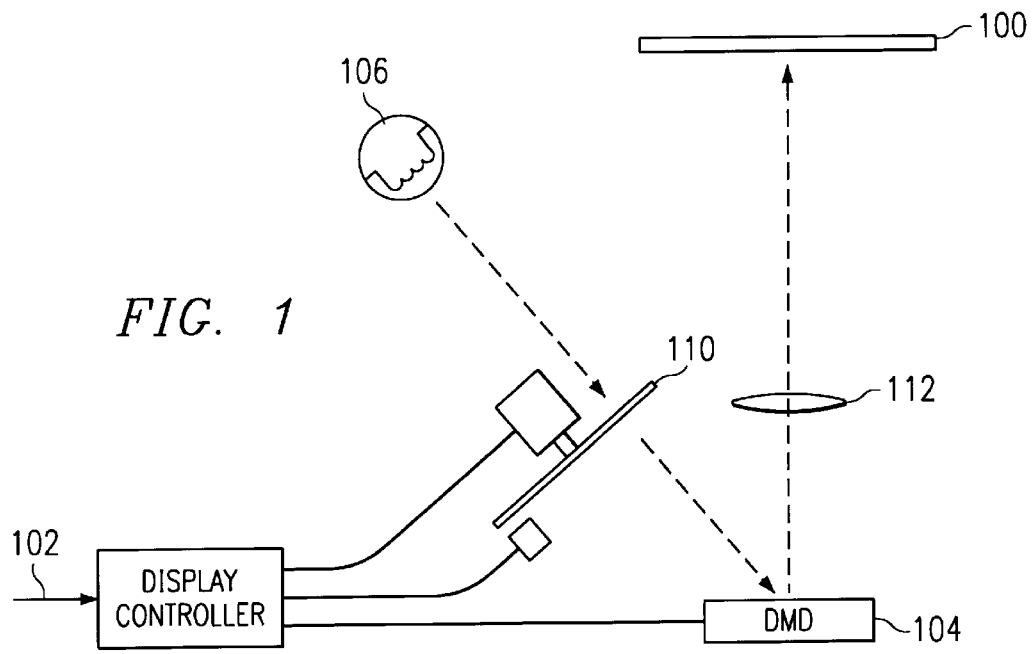
FIG. 1 is a block diagram of a digital micromirror device based display system.

Non-CRT display systems may require timing signals other than those incorporated in the video signal. For example, frame-addressed display devices typically accumulate one frame of image data and then output the entire frame at one time. A basic display system based on the frame-addressed Texas Instruments Digital Micromirror Device (DMD), as shown in FIG. 1, digitizes each pixel of input image data 102 and stores the digitized image data until an entire frame of input image data 102 has been received. The DMD-based display system then loads one bit of image data for all pixels into the DMD 104 and simultaneously alters the position of all of the DMD mirrors such that a light beam from the light source 106 is selectively reflected toward the viewing screen 108. Projection lens 112 focuses the pixel image onto the viewing screen 108. A DMD-based display system display each bit of image data serially. One bit of image data for every pixel is called a "bit-plane." Because the image data is received in a pixel-serial, bit-parallel format, and displayed in a pixel-parallel, bit-serial format, the DMD-based display system must generate a new set of timing signals to control when each bit-plane is displayed.

Figure 2:
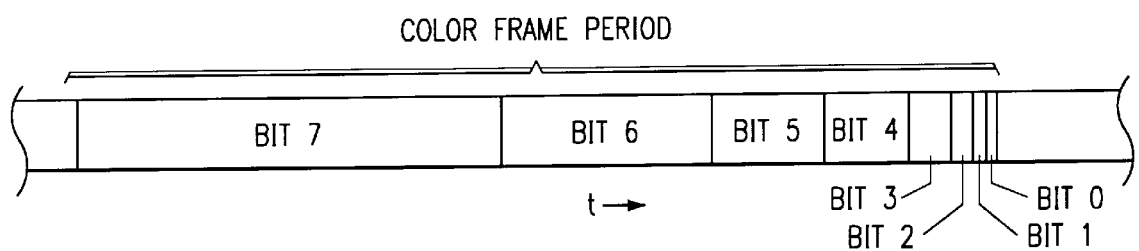
FIG. 2 is a timeline showing the display period for each bit of image data displayed during one frame period of a monochromatic display system similar to the display system of FIG. 1.

The additional timing signals, which control when each bit-plane is loaded into the DMD, are typically created by measuring the input video frame period and dividing the input video frame period into multiple bit-plane periods. As taught by U.S. Pat. No. 5,272,652, issued Mar. 23, 1993, and titled "DMD Architecture and Timing for use in a Pulse-Width Modulated Display System," a gray-scale image is created by weighting the bit-plane periods to coincide with the binary weighting of the input video data. For example, the bit-plane corresponding to the most significant data bit (MSB) is displayed for twice the period of the next significant bit-plane. FIG. 2 shows a timeline detailing the division of one frame period into 8 bit periods.

Figure 3:
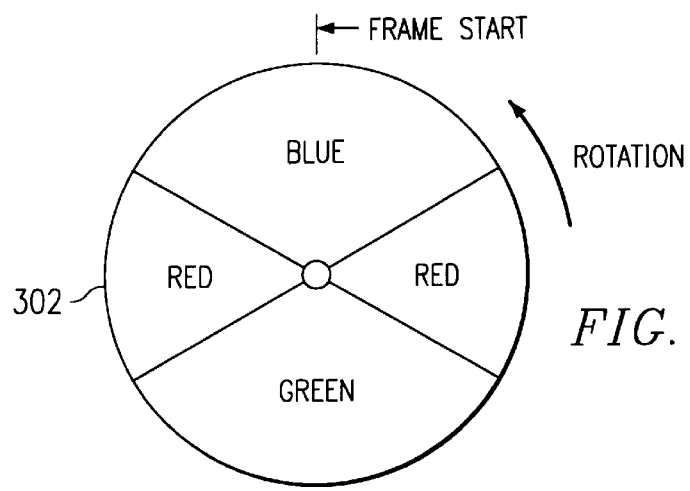
FIG. 3 is a plan view of one embodiment of a color wheel for use in the display system of FIG. 1.
Figure 4:
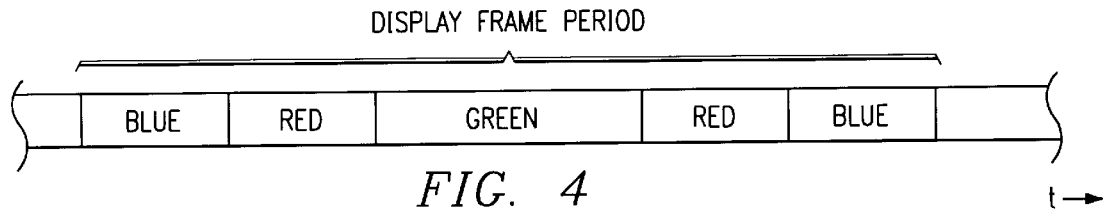
FIG. 4 is a timeline showing the color periods generated by the color wheel of FIG. 3.

To generate a fill-color image with a single-DMD projector, a color wheel 110 is used to sequentially filter light from the light source 106. A sequential-color display system, as shown in FIG. 1, uses three of the color frame periods from FIG. 2, one for each color, to generate a single display frame of the full-color image. The DMD modulates the filtered light to create a monochromatic image during each of the color periods. The human eye integrates the light from sequential monochromatic periods, giving the impression of a multi-color image. A color wheel may include more than 3 segments. For example, the color wheel 302 of FIG. 3 may be used to reduce the artifacts that are created when displaying moving objects. The color wheel 302 of FIG. 3 breaks the three color filters into four filter segments. The color wheel of FIG. 3 will filter light according to the timeline of FIG. 4.

Practical display systems must be capable of adjusting to slight variances in the frame rate of the video source. If the display system cannot compensate for the input frame rate, the display system may occasionally lose or corrupt image data, or the efficiency of the display may be reduced as the system is idled between output frames. In addition to the variance in input video frame rates, display systems with color wheels also must adapt to drift in the color wheel speed. If the color wheel is temporarily turning too fast, the output frame period must be shortened to match the period of one revolution of the color wheel. If the output frame is not shortened to match the rotation of the color wheel, video data from a first frame of video data will be displayed after the color wheel begins its second revolution. The carry over of one frame of video data from one color wheel period to the next destroys the relationship between the image data and the color of the light passing through the color wheel and results in image data of a first color being used to produce an image of a second color. If the color wheel is temporarily turning too slowly, the displayed output frame will finish before the color wheel finishes the entire frame period. This will result in an inefficient idle period until the display system begins to display the next bit-plane of image data. A similar alignment error occurs at each boundary between adjacent color filters.

One solution is to simply shorten the output frame period to ensure that the DMD is finished displaying one frame of data before the color wheel begins the next frame period, and to insert a blank period between the end of the output frame period and the beginning of the following revolution of the color wheel. Although this method prevents one output frame period from over-running one color wheel period, it reduces the brightness of the displayed image by an amount proportional to the blanking period. For example, if the input video frame rate is 59.94 Hz, and the color wheel is allowed to vary +/−1 Hz about the nominal input video frame rate, the color wheel period varies from 16.41 mS to 16.96 mS. If the display system must allow for a color wheel period anywhere between 16.41 mS and 16.96 mS, and the length of each color period is required to be equal, then only 15.3 mS of the color wheel period is used. If the actual color wheel period is 16.96 mS, then the color wheel uncertainty reduces the efficiency of the display system by 9.8%.

Figure 5:
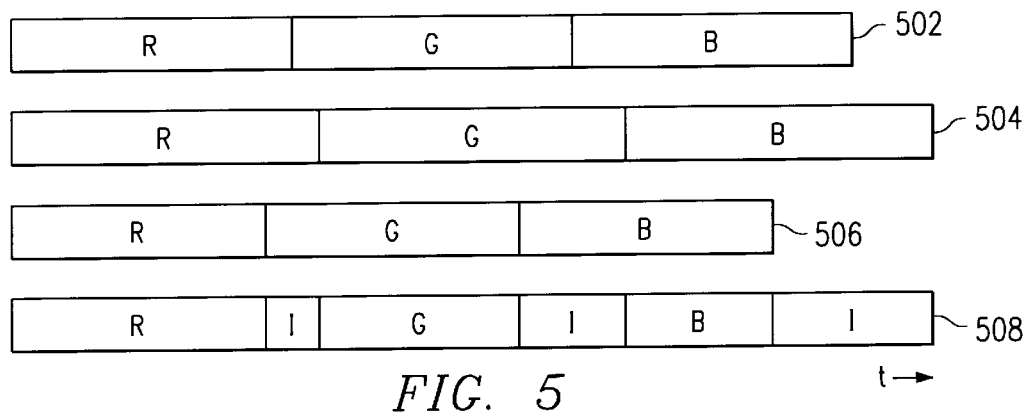
FIG. 5 is a series of timelines showing the color periods generated by a three-segment color wheel rotating at three different speeds and the resulting color display periods.

FIG. 5 shows four timelines depicting the operation of a three-segment color wheel based display system. Each of the first three timelines is divided into segments to denote which of the three color filters is in use. The first timeline 502 shows the periods when a color wheel rotating at a nominal speed generates red (R), green (G), and blue (B) light. The second timeline 504 shows the color periods for a color wheel that is rotating 10% too slowly. The third timeline 506 shows the color periods for a color wheel that is rotating 10% to quickly. The fourth timeline 508 shows the display periods during which image data for each of the three colors is displayed. The periods marked "I" are idle periods during which no color may be displayed due to uncertainty in which filter is in the light path. The 10% rotation speed errors shown in FIG. 5 are exaggerated for illustrative purposes. Typically, there is less than 2% error in the period length.

An improved display system measures the actual color wheel period and adjusts the display frame period to match the actual period. Measuring the color wheel period allows the display system to alter each display frame period to match the actual color wheel period. In a basic embodiment, the display controller measures the color wheel frame period and assigns each bit of data a display period equal to its weighted share of the measured frame period. For example, in a three-color system which uses 8 bits of data for each color, the LSB is assigned a period equal to $1/(3 \times 255)$ of the total color wheel frame period.

Figure 6:
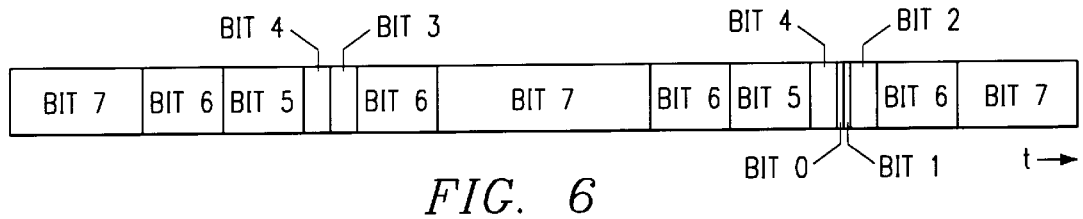
FIG. 6 is a timeline showing one embodiment of a sequence pattern used to display an eight-bit image data word.

The previous discussion has assumed that each bit-plane of data is displayed in one contiguous time segment. Because of the visual artifacts created by motion of either the viewer's eye or objects in the displayed image, most bit-planes are actually displayed during many very short time periods. Breaking the bit-planes into short segments also facilitates horizontal-split-reset, which is a technique that dramatically lowers the necessary peak input data bandwidth of the DMD by independently loading portions of the DMD such that only a small portion of the DMD must be loaded at any one time. The order in which the short segments of each of the bit-planes are displayed in is called a sequence pattern. A typical DMD display system which uses 24 bits of data for each pixel may load data into each pixel well over 300 times each frame. FIG. 6 shows a timeline for a simple one-color sequence pattern. In FIG. 6, image data bits 4 through 7 are split into multiple segments and spread throughout the display timeline. Image data bits 0 through 3 are displayed during a single segment.

The optimum sequence in which to load the image data is a trade-off between image quality and processing overhead, and varies depending on the type of image displayed and the display frame period. Therefore, as the frame period changes, the display sequence is also changed to maximize the image quality. Although emphasis thus far has been placed on correcting for errors in the color wheel period, large changes in the frame rate are also due to the selection of various video source formats. For example, European television systems typically use a 50 Hz frame rate while computer generated graphics may have a 75 Hz frame rate. Therefore, the display system must be able to compensate not only for small drifts in the frame rate, but also for large step changes in the frame rate. It is these large changes in the frame rate that typically benefit from changes in the sequence patterns used to divide the image bits into display segments.

Figure 7:
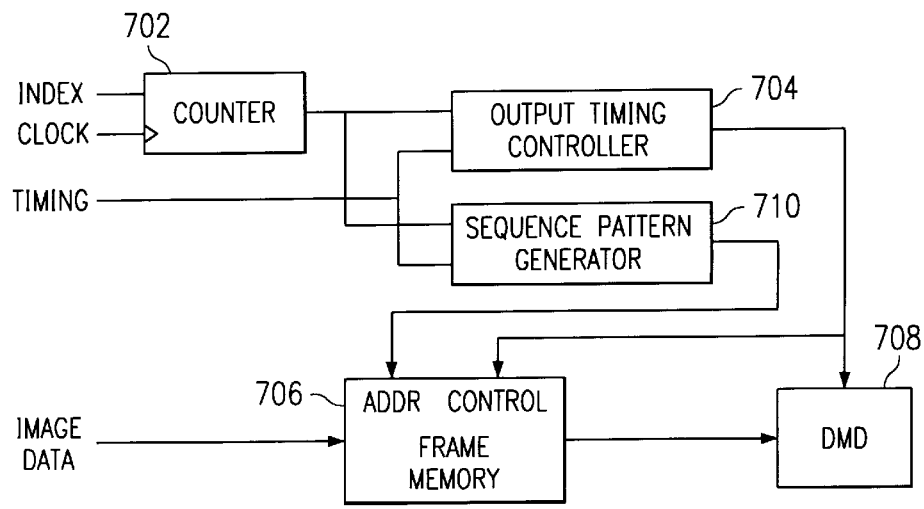
FIG. 7 is block diagram of one embodiment of the display controller of FIG. 1, used to select and scale a sequence pattern which determines the order and duration of the display segments for each image data bit.

According to one embodiment of a display controller using the present invention, shown in FIG. 7, the actual frame period of the color wheel is measured by counter 702. The output of counter 702 is used to communicate the color wheel frame period to the output timing controller 704. The output timing controller 704 generates the timing signals that determine when data is read out of frame memory 706 and into the DMD 708. Additionally, the output period data is used by the sequence pattern generator 710 to determine the order in which data bits are read out of the frame memory 706 and into the DMD 708. As discussed above, the optimum sequence pattern with which to display the individual bit-planes which comprise an image frame varies depending on the available frame time. Image artifacts may also be reduced by alternately using each of a series of sequence patterns.

Some embodiments DMD-based display systems, such as the system taught in U.S. Pat. No. 5,880,573, issued on Mar. 9, 1999, are designed to display a input video data over a wide range of frame rates. For example, a display system may be designed to display input video having a frame rate between 49 Hz and 75 Hz. In order to operate over this wide input frame rate range while still limiting the range over which the color wheel motor is forced to turn the color wheel, the display system may be operated in a spoke synchronous mode. Spoke synchronous mode, as taught by U.S. patent Ser. No. 08/659,485, filed Jun. 6, 1996, only requires the color wheel to turn ⅚ of a revolution during each video frame period. In one embodiment, the display system enters spoke synchronous mode whenever the input frame rate exceeds 63 Hz. Spoke synchronous mode allows a display system to display frame rates between 49 Hz and 75 Hz while limiting the color wheel speed to the range between 49 Hz and 63 Hz.

In the display controller of FIG. 7, the number of 10 Mhz clock periods between color wheel index signals is counted to determine the color wheel period to the nearest 0.1 mS. Using a 10 Mhz clock allows the binary word representing the color wheel period to vary by approximately 45 counts as the color wheel speed varies between 49 Hz and 63 Hz. These 45 different codes are used to communicate the color wheel period to the timing controller 704 and the sequence pattern generator 710. According to one embodiment, the least significant 6 bits of the counter output are used to represent the color wheel frame period. These 6 bits, are input to the timing controller 704 to determine the display period for each data bit, and also to the sequence generator 710 to determine which order the data bits are displayed in. In addition to the lower 6 bits of the period word from counter 702, the output timing generator 704 and the sequence pattern generator 710 each receive a timing signal which allows them to determine what portion of a frame is being displayed. According to one embodiment, the timing signal is the output of another counter that counts the elapsed time of each frame period. Both the timing controller 704 and sequence generator 710 functions may be implemented using either a microprocessor, or one or more lookup tables.

The points at which sequence patterns are changed, as well as the sequence patterns themselves are carefully chosen to prevent generating artifacts in the displayed image. Most video sources generate a video signal having either a 50 Hz, 59.94 Hz, 60 Hz, or 72 Hz frame rate. A 72 Hz frame rate signal will cause the display system to enter spoke synchronous mode which will lower the color wheel speed to 60 Hz. Therefore, the color wheel period of the display system is typically either 50 Hz, 59.94 Hz, or 60 Hz. If the crossover point between one sequence pattern and the next is too close to one of these common frequencies, instability in the video source may cause frequent switching between two sequence patterns. To eliminate the possibility of frequent switching between two sequence patterns, the crossover points are chosen to avoid the tolerance bands of the common display frequencies.

Although the embodiments taught have focused primarily on compensating for drift in a color wheel rotation speed, the invention disclosed herein also allows color wheel based systems to adapt to various nominal frame rates. Additionally, non-color wheel systems may also use the novel features of the invention disclosed herein to efficiently display video signals of differing frame rates. Rather than measuring the period of a color wheel, a non-color wheel based system typically measures the frame period of the input video signal.

Thus, although there has been disclosed to this point a particular embodiment for a system for controlling the frame period for displayed data and method thereof, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of controlling the display period of video data to match the frame rate of a video signal, the method comprising:

measuring a frame period of a video signal;

selecting an optimum frame sequence pattern based on said frame period of said video signal, said frame sequence pattern comprised of a series of segments during which a bit of image data is displayed;

determining a display period for each said segment of said frame sequence pattern based on said measured frame period and said selected frame sequence pattern;

loading a portion of said image data into a spatial light modulator to cause said spatial light modulator to selectively modulate incident light; and repeating said loading step for each said segment of said frame sequence pattern.

2. The method of claim 1 wherein said measuring step comprises counting a number of clock signals between occurrences of a video signal index signal.

3. The method of claim 2 wherein said video signal index signal is the vertical synchronization signal.

4. The method of claim 1 wherein at least one portion of said image data is loaded into said spatial light modulator at least two times during a single frame period.

5. A method of controlling the display period of video data to match the speed of a color wheel, the method comprising:

measuring a frame period of a color wheel;

selecting an optimum frame sequence pattern based on said frame period of said color wheel, said frame sequence pattern comprised of a series of segments during which a bit of image data is displayed;

determining a display period for each said segment of said frame sequence pattern based on said measured frame period and said selected frame sequence pattern;

loading a portion of said image data into a spatial light modulator to cause said spatial light modulator to selectively modulate incident light; and repeating said loading step for each said segment of said frame sequence pattern.

6. The method of claim 5 wherein said measuring step comprises counting a number of clock signals between occurrences of a color wheel index signal.

7. The method of claim 5 wherein at least one portion of said image data is loaded into said spatial light modulator at least two times during a single frame period.

8. A display controller for a display system, said display controller comprising:

a counter for measuring the period of a video signal;

a frame memory for storing image data, said image data comprised of at least two bits of data for each pixel of an image;

a spatial light modulator for receiving said image data from said frame memory and for modulating light in response to said image data;

a sequence pattern generator for controlling the transfer of said image data from said frame memory to said spatial light modulator, said sequence pattern generator varying the order in which said at least two bits of data for each pixel is transferred based on the period of the color wheel as measured by said counter; and an output timing controller for controlling said transfer of said image data between said frame memory and said spatial light modulator based on the period of the video signal as measured by said counter.

9. The display controller of claim 8 wherein said sequence pattern generator is a lookup table.

10. The display controller of claim 8 wherein said output timing controller is a microprocessor.

11. The display controller of claim 8 wherein said display system is a digital micromirror device.

12. A display controller for a display system, said display controller comprising:

a counter for measuring the period of a color wheel;

a frame memory for storing image data, said image data comprised of at least two bits of data for each pixel of an image;

a spatial light modulator for receiving said image data from said frame memory and for modulating light in response to said image data;

a sequence pattern generator for controlling the transfer of said image data from said frame memory to said spatial light modulator, said sequence pattern generator varying the order in which said at least two bits of data for each pixel is transferred based on the period of the color wheel as measured by said counter, and an output timing controller for controlling said transfer of said image data between said frame memory and said spatial light modulator based on the period of the color wheel as measured by said counter.

13. The display controller of claim 12 wherein said sequence pattern generator is a lookup table.

14. The display controller of claim 12 wherein said output timing controller is a microprocessor.

15. The display controller of claim 12 wherein said display system is a digital micromirror device.

* * * * *

UNITED STATES PATENT AND TRADEMARK OFFICE
CERTIFICATE OF CORRECTION

PATENT : 5,986,721
DATED : November 16, 1999
INVENTOR(S) : Girault W. Jones, Jr., Stephen W. Marshall, and Mark L. Burton It is certified that error appears in the above-identified patent and that said Letters Patent is hereby corrected as shown below:

On the title page, item [54] and column 1, lines 1-4, in the title, change "Producing a Rendered Image Version of an Original Image Using an Image Structure Map Representation of the Image" to --System and Method for controlling the Display Frame Period of a Video Display--.

Under item [60] Related U.S. Application Data, insert the following:
  --Provisional Application No. 60/000,168 June 13, 1995.--.

In column 1, line 5, insert the following:
--This application claims priority under 35 U.S.C.§ 119(c) (1) of provisional application number 60/000,168, filed Jun. 13, 1995.

Signed and Sealed this

Thirteenth Day of March, 2001

*Attest:*

NICHOLAS P. GODICI

*Attesting Officer*   Acting Director of the United States Patent and Trademark Office